United States Patent

Shimada et al.

[11] Patent Number: 6,118,591
[45] Date of Patent: *Sep. 12, 2000

[54] IMAGING OPTICAL SYSTEM FOR LIGHT BEAM SCANNING SYSTEM

[75] Inventors: Katsumi Shimada; Masaru Noguchi; Minako Igura, all of Kanagawa-ken, Japan

[73] Assignee: Fuji Photo Film Co., Ltd., Kanagawa-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/134,036

[22] Filed: Aug. 14, 1998

[30] Foreign Application Priority Data

Aug. 15, 1997 [JP] Japan ..................................... 9-220376

[51] Int. Cl.⁷ ............................. G02B 3/00; G02B 13/08; G02B 26/08
[52] U.S. Cl. ........................... 359/662; 359/206; 359/207; 359/208; 359/668; 359/710; 359/726
[58] Field of Search ..................................... 359/205, 206, 359/207, 208, 215, 662, 710, 726, 668

[56] References Cited

U.S. PATENT DOCUMENTS 5,062,679 11/1991 Itabashi ..................... 359/710
5,450,211 9/1995 Kanai et al. ............................. 358/401
5,652,670 7/1997 Hayashi .................................. 359/205
5,673,137 9/1997 Shimada et al. ........................ 359/206

FOREIGN PATENT DOCUMENTS 0 441 350 A2   8/1991   European Pat. Off. .
WO 90/03589    4/1990   WIPO .

*Primary Examiner*—Georgia Y Epps
*Assistant Examiner*—Evelyn A. Lester
*Attorney, Agent, or Firm*—Sughrue, Mion, Zinn, Macpeak & Seas, PLLC

[57] ABSTRACT

An imaging optical system for a light beam scanning system for causing a light bundle deflected by a deflector to form an image on a predetermined surface to be scanned and causing the image of the light bundle to scan the surface at a constant speed is provided with an anamorphic lens for compensating for tilt of the deflecting surface of the deflector. The imaging optical system satisfies formula $$0 \leq \phi 1/\phi \leq 0.1|M|+0.45$$

wherein $\phi 1$ represents the power of the anamorphic lens in the main scanning direction, $\phi$ represents the power of the entire imaging optical system in the main scanning direction and M represents the lateral magnification when the deflecting angle by the deflector is 0.

15 Claims, 11 Drawing Sheets

IMAGING OPTICAL SYSTEM FOR LIGHT BEAM SCANNING SYSTEM

BACKGROUND OF THE INVENTION

1. Field of the Invention

This invention relates to an imaging optical system for a light beam scanning system which deflects a light bundle such as a laser beam to cause the light bundle to scan a predetermined surface.

2. Description of the Related Art

There has been known a light beam scanning system in which a light beam is deflected by a deflector such as a rotary polygonal mirror and is caused to scan a surface. Such a light beam scanning system is used, for instance, in a laser recording system or a laser read-out system. The light beam scanning system generally comprises a laser for emitting a laser beam, a rotary polygonal mirror which deflects the light bundle emitted from the laser and an imaging optical system including a fθ lens which focuses the deflected light bundle on a predetermined surface to be scanned to form an image in a height proportional to the deflecting angle at the rotary polygonal mirror.

Figure 10:
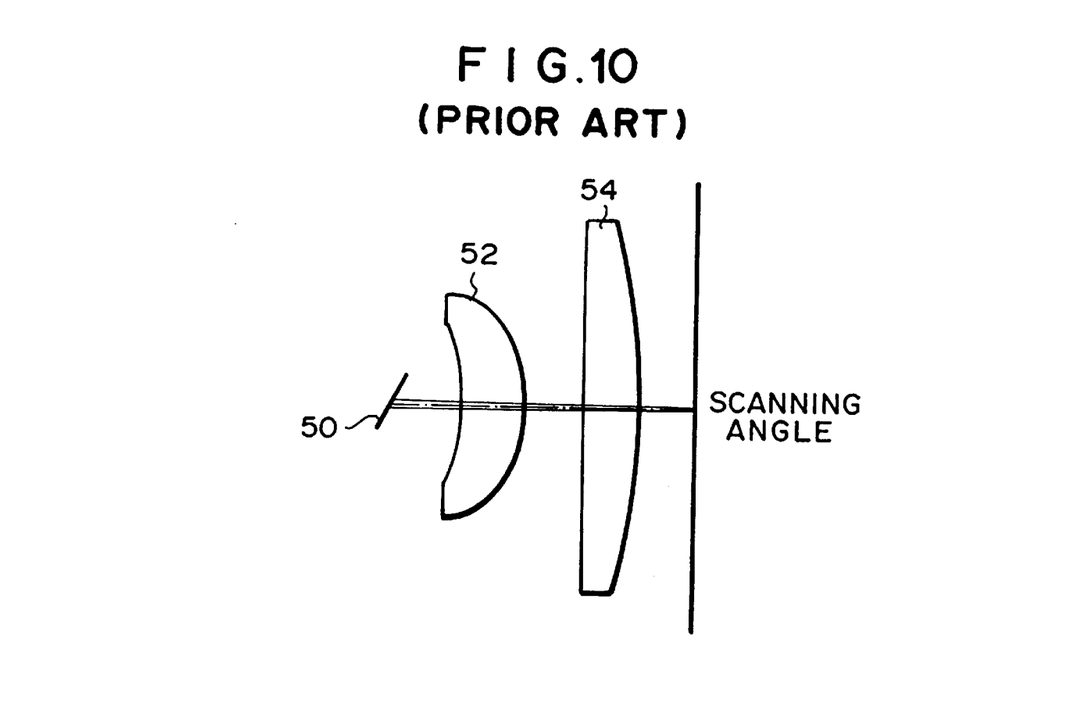
FIG. 10 shows an example of an imaging optical system in which the surface tilt compensation is applied.

In such a light beam scanning system, there has been known a surface tilt compensation optical system which corrects shift of the scanning lines due to tilt of the deflecting surface of the deflector. FIG. 10 shows an example of an imaging optical system in which the surface tilt compensation is applied. The imaging optical system comprises a deflector 50, a positive meniscus lens 52 made of plastic and an anamorphic lens 54 made of glass arranged in this order. By arranging the optical system by use of a combination of a plastic lens and a glass lens, the plastic lens may be weak in power (refracting power). Accordingly increase in the ratio of the thickness of the central portion to that of the peripheral portion can be suppressed, thereby suppressing change in optical properties of the plastic lens due to change of environment, production of the plastic lens is facilitated, the size of the optical system can be small, and the optical system can be better in its aberration and fθ characteristics.

In the surface tilt compensation optical system employing an anamorphic lens, the lateral magnification (magnification in the sub-scanning direction) varies depending on the scanning angle due to the anamorphic lens having power in the main scanning direction. This is mainly because the anamorphic lens must be large in the ratio of the thickness of the central portion to that of the peripheral portion in order to compensate for the surface tilt of the deflector.

Figure 11:
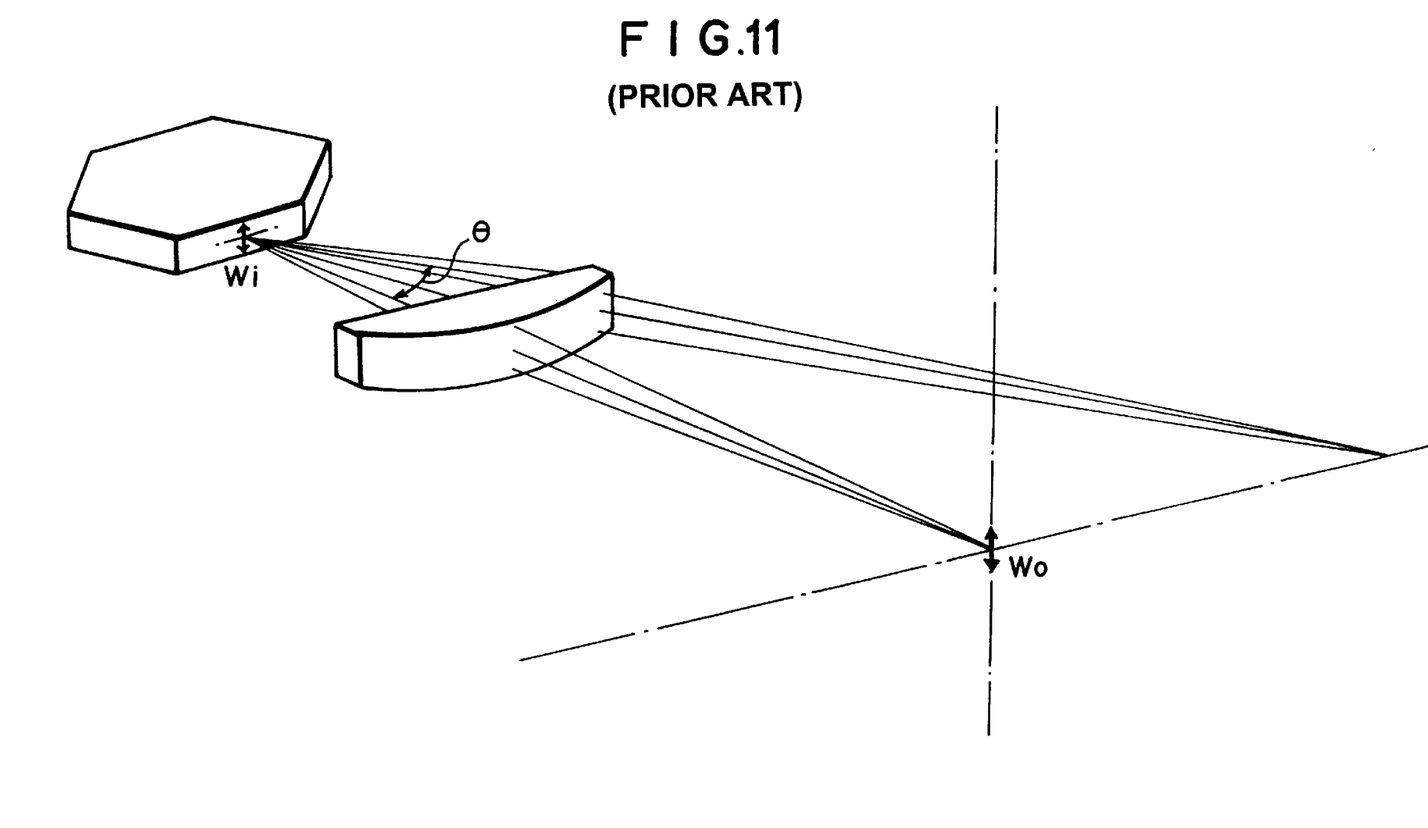
FIG. 11 shows the relation between the beam diameter and the lateral magnification of an imaging optical system in which the surface tilt compensation is applied.

FIG. 11 shows the relation between the beam diameter and the lateral magnification of an imaging optical system in which the surface tilt compensation is applied. In FIG. 11, the diameter Wo of the beam in the sub-scanning direction on the image plane (the surface to be scanned) can be expressed by the following formula.

$$Wo = M(\theta) \times Wi$$

wherein Wi represents the diameter in the sub-scanning direction of a beam impinging upon the deflecting surface and M(θ) represents the lateral magnification as a function of the scanning angle θ.

As can be seen from the formula above, when the lateral magnification M(θ) fluctuates with the scanning angle θ, the beam diameter Wo in the sub-scanning direction fluctuates according to the scanning angle θ and the scanning spot cannot be uniform in diameter.

SUMMARY OF THE INVENTION

In view of the foregoing observations and description, the primary object of the present invention is to provide an imaging optical system for a light beam scanning system which is provided with an anamorphic lens for surface tilt compensation and in which fluctuation in lateral magnification can be suppressed.

In accordance with the present invention, there is provided an imaging optical system for a light beam scanning system for causing a light bundle deflected by a deflector to form an image on a predetermined surface to be scanned and causing the image of the light bundle to scan the surface at a constant speed, wherein the improvement comprises that the imaging optical system is provided with an anamorphic lens for compensating for tilt of the deflecting surface of the deflector, and the imaging optical system satisfies formula $$0 \leq \phi1/\phi \leq 0.1|M| + 0.45$$

wherein $\phi1$ represents the power of the anamorphic lens in the main scanning direction, $\phi$ represents the power of the entire imaging optical system in the main scanning direction and M represents the lateral magnification when the deflecting angle by the deflector is 0.

In the imaging optical system of the present invention, fluctuation in lateral magnification with change in the scanning angle can be suppressed to not larger than about 23%.

When the imaging optical system satisfies formula $0 \leq \phi1/\phi \leq 0.1|M| + 0.35$, fluctuation in lateral magnification with change in the scanning angle can be suppressed to not larger than about 20%.

Preferably the imaging optical system of the present invention comprises a positive meniscus lens, an anamorphic lens having positive power in the main scanning direction, and a cylindrical mirror having power only in the sub-scanning direction arranged in this order from the deflector.

More preferably the meniscus lens is made of plastic and/or the meniscus lens is aspheric in at least one side.

Further it is preferred that the surface of the anamorphic lens facing the deflector be a concave cylindrical surface having power only in the sub-scanning direction and the surface of the anamorphic lens facing the surface to be scanned be a convex spherical surface.

As will be described in more detail later, when the ratio $\phi1/\phi$ of the power of the anamorphic lens in the main scanning direction to the power of the entire imaging optical system in the main scanning direction is in the range described above, fluctuation in lateral magnification with change in the scanning angle can be suppressed to not larger than about 23% or to not larger than about 20%.

Further when the imaging optical system of the present invention is formed by a combination of a plastic lens (a positive meniscus lens) and a glass lens (an anamorphic lens), the size of the optical system can be small, and the optical system can be better in its aberration and fθ characteristics.

Figure 12:
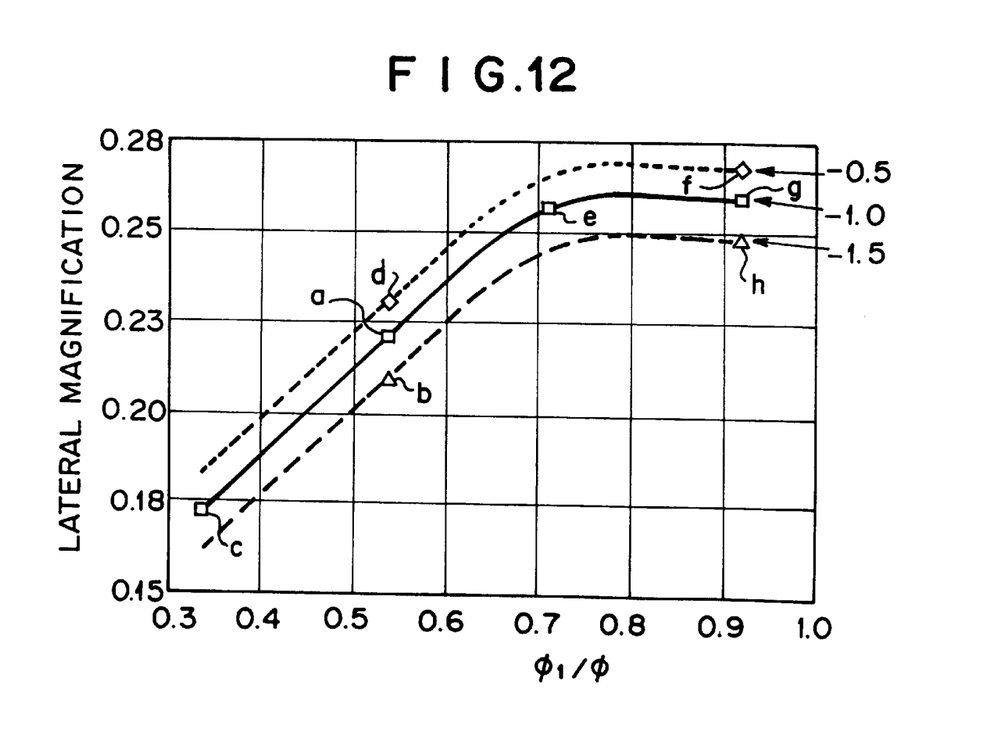
FIG. 12 shows the relation between fluctuation in lateral magnification and the power ratio $\phi 1/\phi$ of the anamorphic lens versus the scanning angle.

The reason why fluctuation in lateral magnification with change in the scanning angle can be suppressed to not larger than about 23% or to not larger than about 20% when the power ratio $\phi1/\phi$ of the power of the anamorphic lens in the main scanning direction to the power of the entire imaging optical system in the main scanning direction is in the range described above will be described with reference to FIG. 12, hereinbelow. FIG. 12 shows a result of simulation in which the relation between fluctuation in lateral magnification with change in the scanning angle and the power ratio $\phi1/\phi$ is calculated for cases where the lateral magnification M when the deflecting angle by the deflector is 0 (will be referred to as "axial lateral magnification" hereinbelow) is −0.5, −1.0 and −1.5. In FIG. 12, the result for the axial lateral magnification M of −0.5 is shown by the fine dashed line, that for the axial lateral magnification M of −1.0 is shown by the solid line and that for the axial lateral magnification M of −1.5 is shown by the rough dashed line. The triangles, squares and diamonds indicated at a to h on the respective lines show the values for imaging optical systems to be described later in the description of preferred embodiments.

As can be understood from FIG. 12, fluctuation in the lateral magnification is increased as the power of the anamorphic lens in the main scanning direction becomes stronger (as the power ratio $\phi 1/\phi$ increases) though the values slightly vary depending on the axial lateral magnification M. Thus it can be understood that in order to make fluctuation in the lateral magnification, for instance, not larger than 23%, the power ratio $\phi 1/\phi$ should be not larger than about 0.55 when the axial lateral magnification is −0.5 and should be not larger than about 0.6 when the axial lateral magnification is −1.5. Since fluctuation in lateral magnification changes with the power ratio $\phi 1/\phi$ in substantially the same manner for different axial lateral magnifications, the aforesaid formula $0 \leq \phi 1/\phi \leq 0.1|M|+0.45$ is derived as the condition for making fluctuation in the lateral magnification not larger than 23%.

Similarly in order to make fluctuation in the lateral magnification not larger than 20%, the power ratio $\phi 1/\phi$ should be not larger than about 0.4 when the axial lateral magnification is −0.5 and should be not larger than about 0.5 when the axial lateral magnification is −1.5. Thus the aforesaid formula $0 \leq \phi 1/\phi \leq 0.1|M|+0.35$ is derived as the condition for making fluctuation in the lateral magnification not larger than 20%.

DESCRIPTION OF THE PREFERRED EMBODIMENTS

Figure 1A:
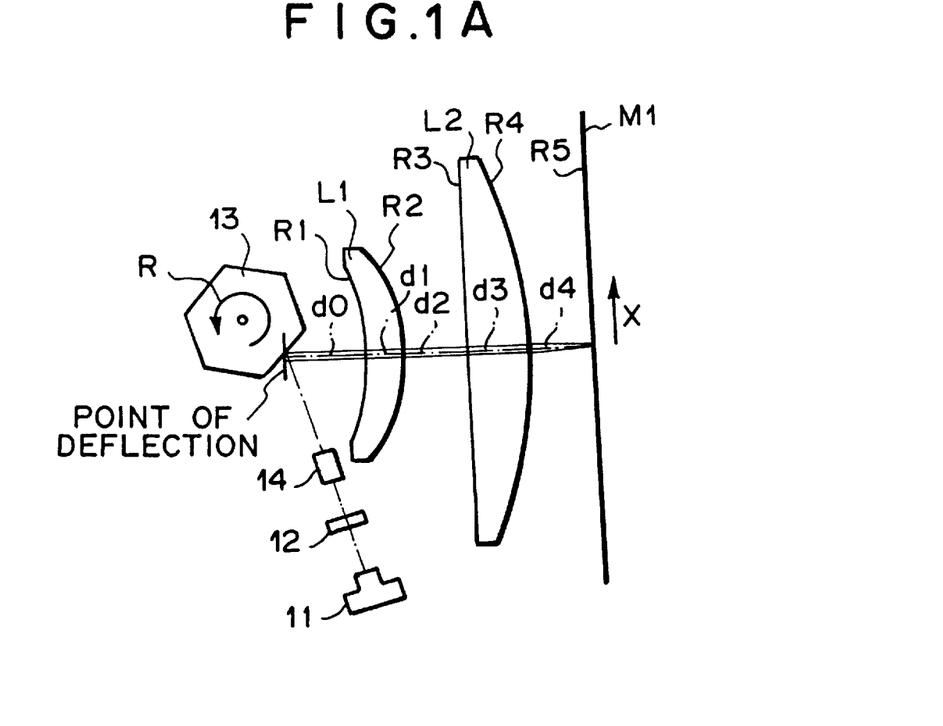
FIG. 1A is a cross-sectional view taken in the main scanning direction of a light beam scanning system provided with an imaging optical system in accordance with a first embodiment of the present invention.
Figure 1B:
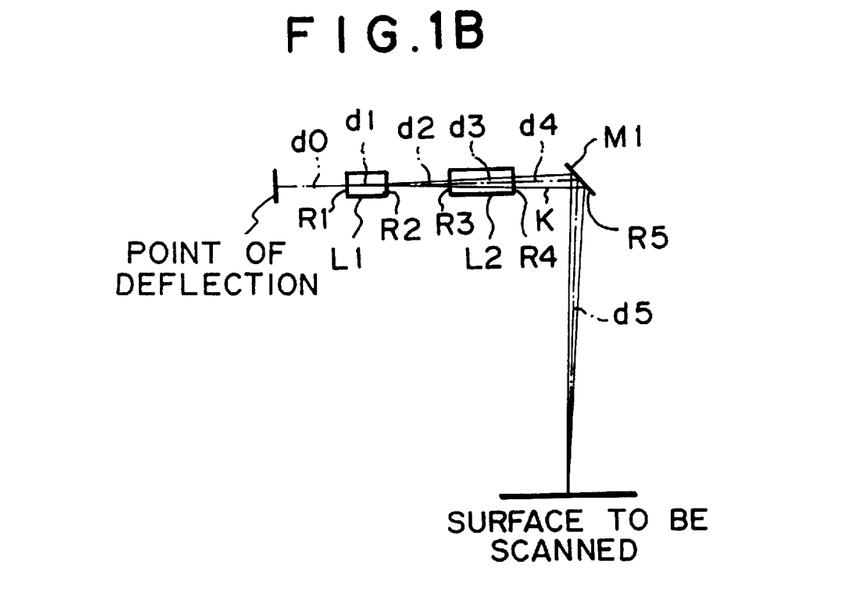
FIG. 1B is a cross-sectional view taken in the sub-scanning direction of the imaging optical system.

In FIG. 1, a light beam scanning system provided with an imaging optical system in accordance with a first embodiment of the present invention comprises a laser 11, a collimator lens 12 which collimates a laser beam emitted from the laser 11, and an incident light imaging optical system 14 such as a cylindrical lens which causes the parallel light bundle passing through the collimator lens 12 to form a line image near a deflecting surface of a polygonal mirror 13, which is rotated by a motor (not shown) to deflect the incident light bundle toward the imaging optical system of the first embodiment. The imaging optical system of the first embodiment causes the light bundle deflected by the polygonal mirror 13 to form an image on a predetermined surface to be scanned and causes the image of the light bundle to scan the surface at a constant speed.

The imaging optical system of the first embodiment comprises a single positive meniscus lens L1 which is aspheric in both the faces and is concave toward the polygonal mirror 13 and is made of plastic, an anamorphic lens L2 having positive power in the main scanning direction, and a cylindrical mirror M1 having power only in the sub-scanning direction. The face of the anamorphic lens L2 facing toward the polygonal mirror 13 is a concave cylindrical face having power only in the sub-scanning direction and the face of the anamorphic lens L2 facing toward the surface to be scanned is a convex spherical face.

The radii of curvature R1 to R4 (mm) of the refracting surfaces of the positive meniscus lens L1 and the anamorphic lens L2, the radius of curvature R5 (mm) of the cylindrical mirror M1, the axial surface separation $d_0$ (mm) between the deflecting point at the polygonal mirror 13 and the meniscus lens L1, the central thickness $d_1$ (mm) of the meniscus lens L1, the axial surface separation $d_2$ (mm) between the meniscus lens L1 and the anamorphic lens L2, the central thickness $d_3$ (mm) of the anamorphic lens L2, the axial surface separation $d_4$ (mm) between the anamorphic mirror L2 and the cylindrical lens M1, and the refractive indexes $n_1$ and $n_3$ for the sodium d-line of the meniscus lens L1 and the anamorphic lens L2 of the imaging optical system of the first embodiment are as shown in the following table 1.

In table 1 and the tables to be described later, the radius of curvature R is positive when the surface is convex toward the deflecting point and is negative when the surface is convex toward the surface to be scanned.

The value designated by * represents the radius of curvature on the optical axis (at the pole of an aspheric surface) and means that the aspheric surface has a shape defined by the following formula (1).

$$z = ch^2/[1+\{1-(1+K)c^2h^2\}^{1/2}] + a_1 h^4 + a_2 h^6 + a_3 h^8 + a_4 h^{10} \quad (1)$$

wherein z represents the sag of the surface parallel to the z-axis, h represents the height above the optical axis, c represents the curvature at the pole of the surface, K represents a conic constant, and $a_1$ to $a_4$ respectively represent fourth-order, sixth-order, eighth-order and tenth-order aspheric coefficients.

The imaging optical system of this embodiment is −1.0 in axial lateral magnification (the lateral magnification when the deflecting angle (the scanning angle) by the deflector is 0), and 0.54 in power ratio $\phi 1/\phi$ and satisfies the following formula $$0 \leq \phi 1/\phi \leq 0.1|M| + 0.45 \quad (2)$$

wherein $\phi 1$ represents the power of the anamorphic lens in the main scanning direction, and $\phi$ represents the power of the entire imaging optical system in the main scanning direction. In the imaging optical system of this embodiment, fluctuation in lateral magnification is not larger than 23% (square mark a in FIG. 12).

TABLE 1

| | M = −1.0 | $\phi 1/\phi = 0.54$ | |
|---|---|---|---|
| R | d | n | note |
| R1 = −148.564 * | $d_0$ = 34.18 | | |
| K = −14.644 | | | |
| $a_1$ = −0.10281 E-05 | | | |
| $a_2$ = 0.63246 E-09 | | | |
| $a_3$ = −0.31298 E-12 | | | |
| $a_4$ = 0.39528 E-16 | $d_1$ = 20.94 | $n_1$ = 1.526750 | |

TABLE 1-continued

| | M = −1.0 | $\phi 1/\phi = 0.54$ | |
|---|---|---|---|
| R | d | n | note |
| R2 = −93.193 * | | | |
| K = 1.3152 | | | |
| $a_1$ = −0.37030 E-07 | | | |
| $a_2$ = 0.816683 E-10 | | | |
| $a_3$ = 0.134247 E-13 | $d_2$ = 31.55 | | |
| $a_4$ = −0.836380 E-17 | | | |
| R3 = −43.493 : sub | | | |
| = ∞ : main | $d_3$ = 32.00 | $n_3$ = 1.614977 | |
| R4 = −238.697 | | | |
| | $d_4$ = 77.22 | | |
| R5 = −172.020 | | | CYM plane |
| | d5 = 161.53 | | image plane |

The operation of the imaging optical system of this embodiment will be described, hereinbelow. A laser beam emitted from the laser 11 is collimated by the collimator lens 12 and a line image of the collimated laser beam is formed on the deflecting surface of the polygonal mirror 13 by the incident light imaging optical system 14.

After being reflected by the deflecting surface of the polygonal mirror 13, the laser beam travels through the positive meniscus lens L1 and the anamorphic lens L2 and is reflected by the cylindrical mirror M1 and is focused on the surface to be scanned to form a scanning spot. Since the polygonal mirror 13 is rotated in the direction of arrow R at a high speed, the scanning spot repeatedly scans the surface of the cylindrical mirror M1 in the direction of arrow X (main scanning) and accordingly scans the surface to be scanned after being reflected by the cylindrical mirror M1.

Figure 2A:
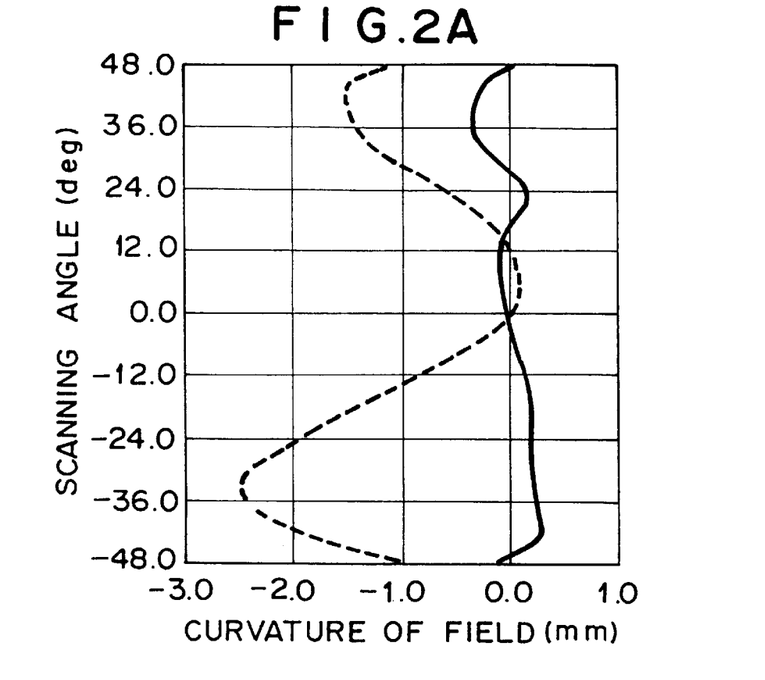
FIG. 2A is a view showing the characteristics of curvature of field of the imaging optical system.
Figure 2B:
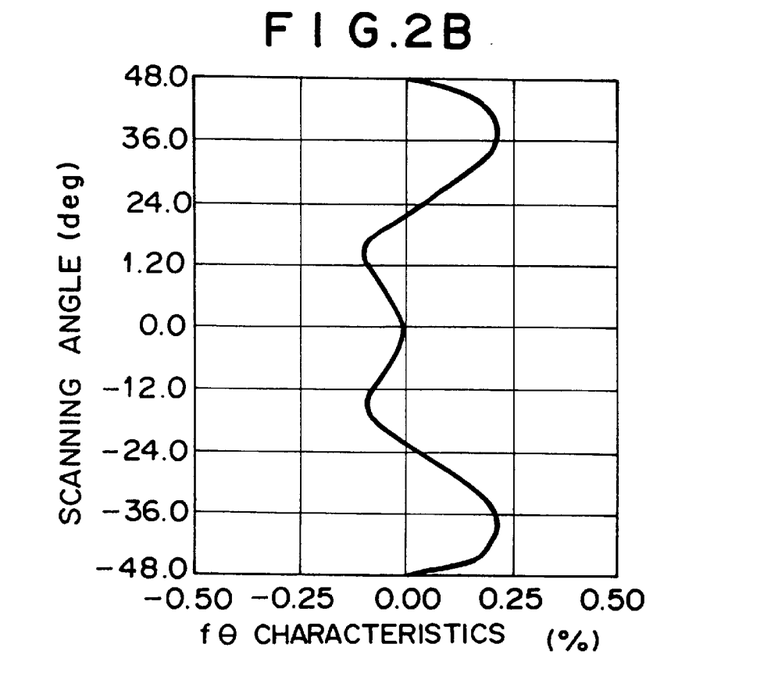
FIG. 2B is a view showing the fθ characteristics of the imaging optical system.

FIGS. 2A and 2B respectively show curvature of field and fθ characteristics of the imaging optical system of this embodiment. In FIG. 2A, the solid line shows the curvature of field in the main scanning direction and the dashed line shows that in the sub-scanning direction (the same for the following drawings). As can be understood from FIGS. 2A and 2B, in the imaging optical system of this embodiment, aberrations are well corrected and also the fθ characteristics are excellent.

Thus in the imaging optical system of this embodiment, fluctuation in lateral magnification by the scanning angle can be suppressed by limiting the power in the main scanning direction of the anamorphic lens L2 within the range defined by formula (2). Further since the imaging optical system of this embodiment is formed by a combination of a plastic lens (a positive meniscus lens) and a glass lens (a anamorphic lens), the ratio of the thickness of the central portion to that of the peripheral portion of the plastic lens may be relatively small, whereby production of the plastic lens is facilitated and fluctuation in the position on which the laser beam is focused due to change in the environmental condition such as the environmental temperature can be suppressed.

An imaging optical system in accordance with a second embodiment will be described with reference to table 2 and FIGS. 3A to 3D.

Figure 3A:
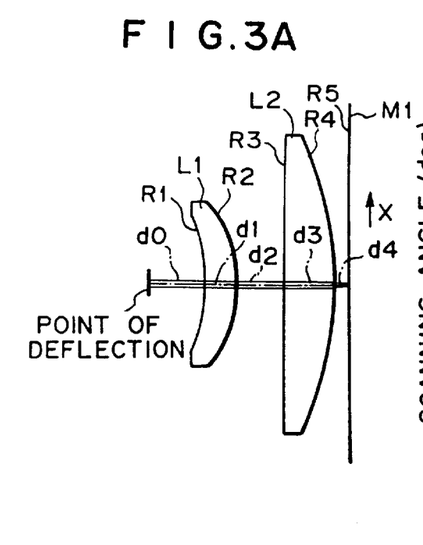
FIGS. 3A to 3D are a cross-sectional view taken in the main scanning direction of an imaging optical system in accordance with a second embodiment of the present invention, a cross-sectional view taken in the sub-scanning direction of the imaging optical system, a view showing the characteristics of curvature of field of the imaging optical system, and a view showing the fθ characteristics of the imaging optical system, respectively.
Figure 3B:
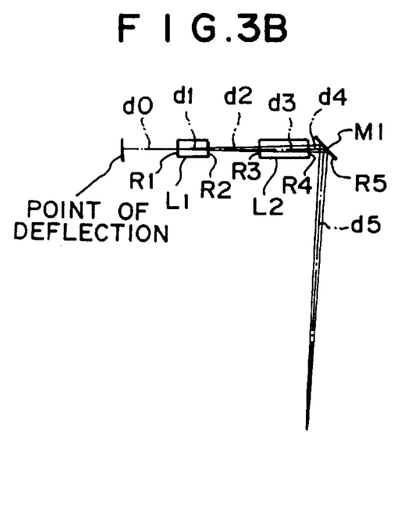
Figure 3C:
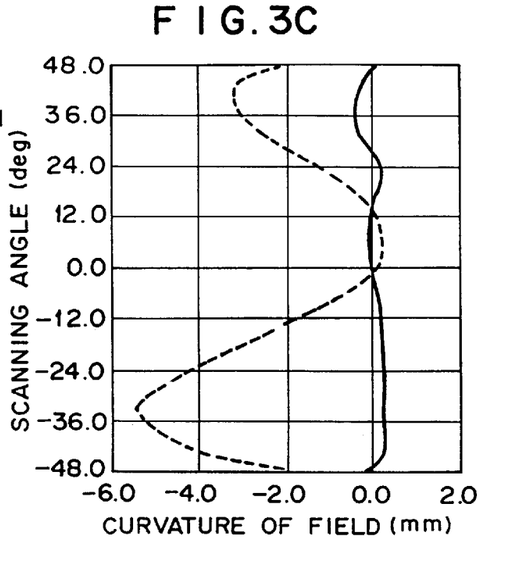
Figure 3D:
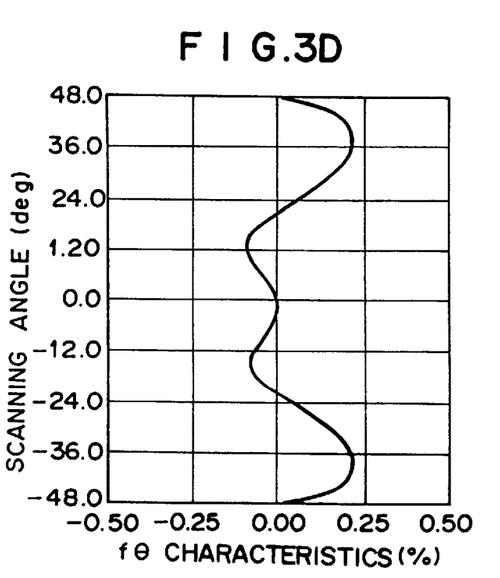

The imaging optical system of this embodiment comprises a single positive meniscus lens L1 which is aspheric in both the faces and is concave toward the polygonal mirror 13 and is made of plastic, an anamorphic lens L2 having positive power in the main scanning direction, and a cylindrical mirror M1 having power only in the sub-scanning direction. The face of the anamorphic lens L2 facing toward the polygonal mirror 13 is a concave cylindrical face having power only in the sub-scanning direction and the face of the anamorphic lens L2 facing toward the surface to be scanned is a convex spherical face.

The specification of the imaging optical system of this embodiment is shown in the following table 2. In this embodiment, the radius of curvature of the concave cylindrical face of the anamorphic lens L2 and the radius of curvature of the cylindrical mirror M1 are selected so that the axial lateral magnification M of the imaging optical system becomes −1.5. Further the power ratio $\phi1/\phi$ is 0.54. Accordingly the imaging optical system of this embodiment satisfies formula (2) and accordingly is not larger than 23% in fluctuation in lateral magnification (triangular mark b in FIG. 12).

TABLE 2

| R | $M = -1.5$ $\phi1/\phi = 0.54$ | | |
|---|---|---|---|
| | d | n | note |
| R1 = −148.564 * | $d_0 = 34.18$ | | |
| K = −14.644 | | | |
| $a_1 = -0.10281$ E-05 | | | |
| $a_2 = 0.63246$ E-09 | | | |
| $a_3 = -0.31298$ E-12 | | | |
| $a_4 = 0.39528$ E-16 | $d_1 = 20.94$ | $n_1 = 1.526750$ | |
| R2 = −93.193 * | | | |
| K = 1.3152 | | | |
| $a_1 = -0.37030$ E-07 | | | |
| $a_2 = 0.816683$ E-10 | | | |
| $a_3 = 0.134247$ E-13 | | | |
| | $d_2 = 31.55$ | | |
| $a_4 = -0.836380$ E-17 | | | |
| R3 = −43.915 : sub | | | |
| = ∞ : main | $d_3 = 32.00$ | $n_3 = 1.614977$ | |
| R4 = −238.697 | | | |
| | $d_4 = 9.53$ | | |
| R5 = −152.818 | | | CYM plane |
| | d5 = 184.74 | | |
| | | | image plane |

Also in this embodiment, fluctuation in lateral magnification is not larger than 23%. Further as can be understood from FIGS. 3C and 3D, in the imaging optical system of this embodiment, aberrations are well corrected and also the fθ characteristics are excellent.

An imaging optical system in accordance with a third embodiment where fluctuation in lateral magnification is suppressed to not larger than 20% will be described with reference to table 3 and FIGS. 4A to 4D.

Figure 4A:
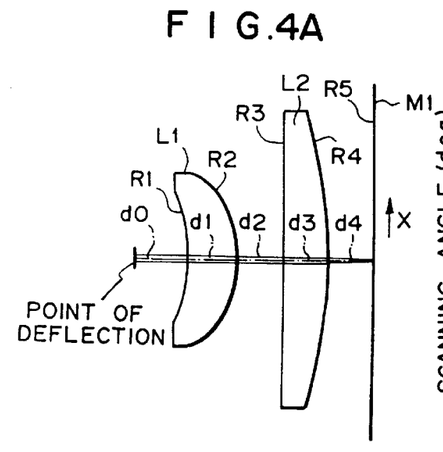
FIGS. 4A to 4D are a cross-sectional view taken in the main scanning direction of an imaging optical system in accordance with a third embodiment of the present invention, a cross-sectional view taken in the sub-scanning direction of the imaging optical system, a view showing the characteristics of curvature of field of the imaging optical system, and a view showing the fθ characteristics of the imaging optical system, respectively.
Figure 4B:
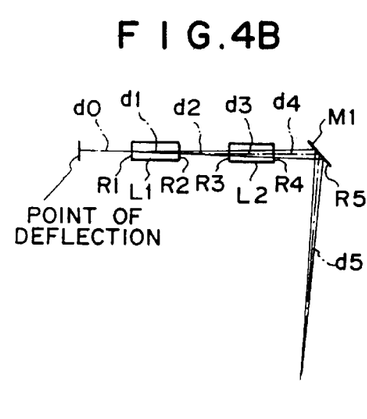
Figure 4C:
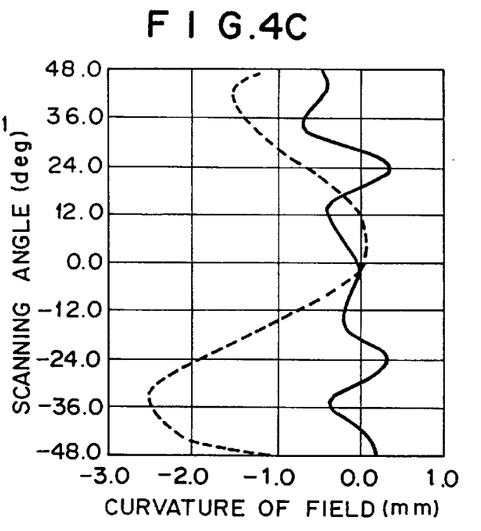
Figure 4D:
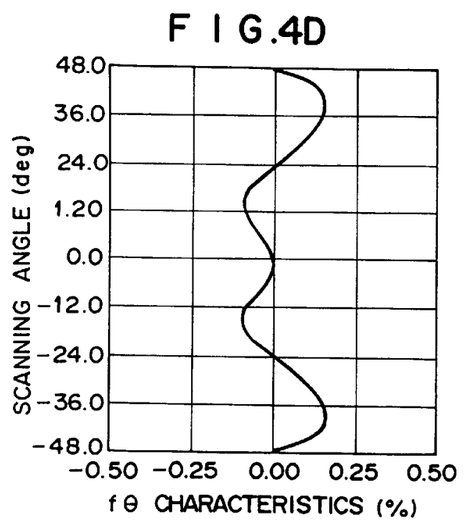

The imaging optical system of this embodiment comprises a single positive meniscus lens L1 which is aspheric in both the faces and is concave toward the polygonal mirror 13 and is made of plastic, an anamorphic lens L2 having positive power in the main scanning direction, and a cylindrical mirror M1 having power only in the sub-scanning direction. The face of the anamorphic lens L2 facing toward the polygonal mirror 13 is a concave cylindrical face having power only in the sub-scanning direction and the face of the anamorphic lens L2 facing toward the surface to be scanned is a convex spherical face.

The specification of the imaging optical system of this embodiment is shown in the following table 3. The imaging optical system of this embodiment is designed so that the axial lateral magnification M becomes −1.0 and the power of the anamorphic lens in the main scanning direction becomes weaker. The power ratio $\phi1/\phi$ is 0.34. Accordingly the imaging optical system of this embodiment satisfies the following formula (3) and accordingly is not larger than 20% in fluctuation in lateral magnification (square mark c in FIG. 12).

$$0 \leq \phi1/\phi \leq 0.1|M|+0.35 \qquad (3)$$

TABLE 3

| R | $M = -1.0$ $\phi1/\phi = 0.34$ | | |
|---|---|---|---|
| | d | n | note |
| R1 = −176.108 * | $d_0 = 35.00$ | | |
| K = −23.840 | | | |
| $a_1 = -0.10387$ E-05 | | | |
| $a_2 = 0.40783$ E-09 | | | |
| $a_3 = -0.22064$ E-12 | | | |
| $a_4 = 0.12564$ E-16 | $d_1 = 33.97$ | $n_1 = 1.526750$ | |
| R2 = −88.828 * | | | |
| K = 1.1038 | | | |
| $a_1 = -0.27541$ E-07 | | | |
| $a_2 = 0.19677$ E-11 | | | |
| $a_3 = 0.21825$ E-13 | | | |
| | $d_2 = 32.45$ | | |
| $a_4 = -0.51223$ E-17 | | | |
| R3 = −52.590 : sub | | | |
| = ∞ : main | $d_3 = 30.00$ | $n_3 = 1.614977$ | |
| R4 = −384.044 | | | |
| | $d_4 = 30.19$ | | |
| R5 = −172.664 | | | CYM plane |
| | d5 = 157.78 | | |
| | | | image plane |

In this embodiment, fluctuation in lateral magnification is not larger than 20%. Further as can be understood from FIGS. 4C and 4D, in the imaging optical system of this embodiment, aberrations are well corrected and also the fθ characteristics are excellent.

Examples of imaging optical systems where fluctuation in lateral magnification is larger than 23% will be described with reference to tables 4 to 8 and FIGS. 5 (5A to 5D) to 9 (9A to 9D).

As shown in FIGS. 5A and 5B, 6A and 6B, 7A and 7B, 8A and 8B, and 9A and 9B, each of the imaging optical systems basically comprises, as the imaging optical systems of the first to third embodiments, a single positive meniscus lens L1 which is aspheric in both the faces and is concave toward the polygonal mirror 13 and is made of plastic, an anamorphic lens L2 having positive power in the main scanning direction, and a cylindrical mirror M1 having power only in the sub-scanning direction. The face of the anamorphic lens L2 facing toward the polygonal mirror 13 is a concave cylindrical face having power only in the sub-scanning direction and the face of the anamorphic lens L2 facing toward the surface to be scanned is a convex spherical face.

The specifications of the imaging optical systems are shown in the following tables 4 to 8.

Figure 5A:
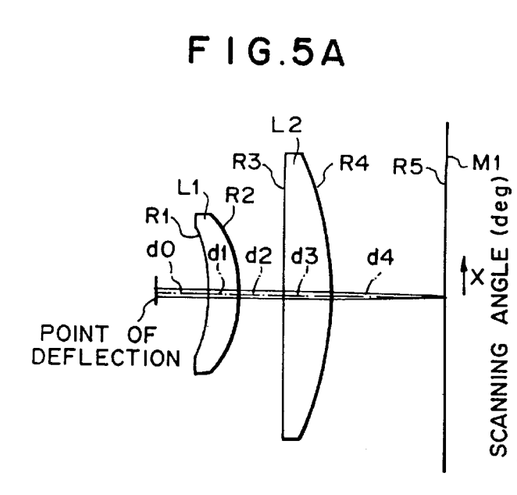
FIGS. 5A to 5D are a cross-sectional view taken in the main scanning direction of an example of an imaging optical system in which fluctuation in lateral magnification is not smaller than 23%, a cross-sectional view taken in the sub-scanning direction of the imaging optical system, a view showing the characteristics of curvature of filed of the imaging optical system, and a view showing the fθ characteristics of the imaging optical system, respectively.
Figure 5B:
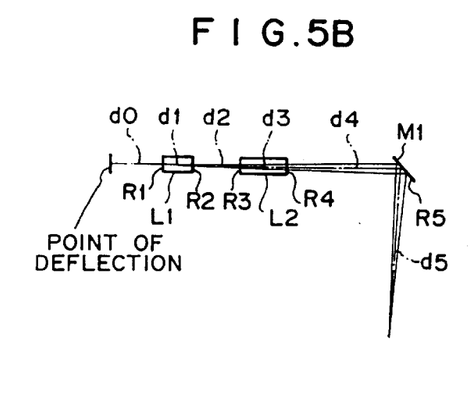
Figure 5C:
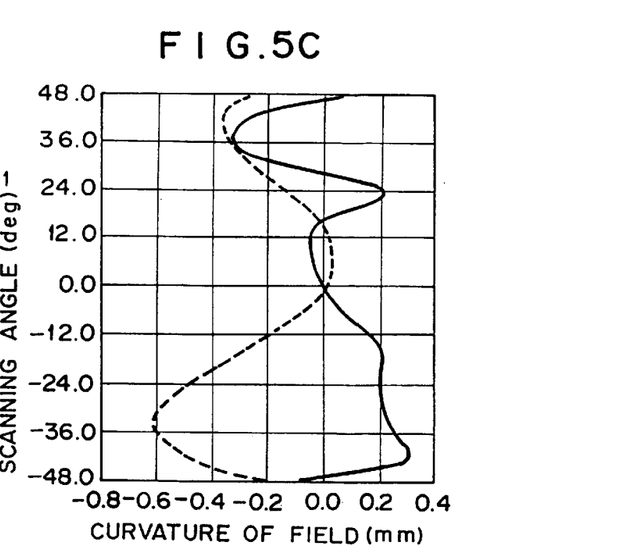
Figure 5D:
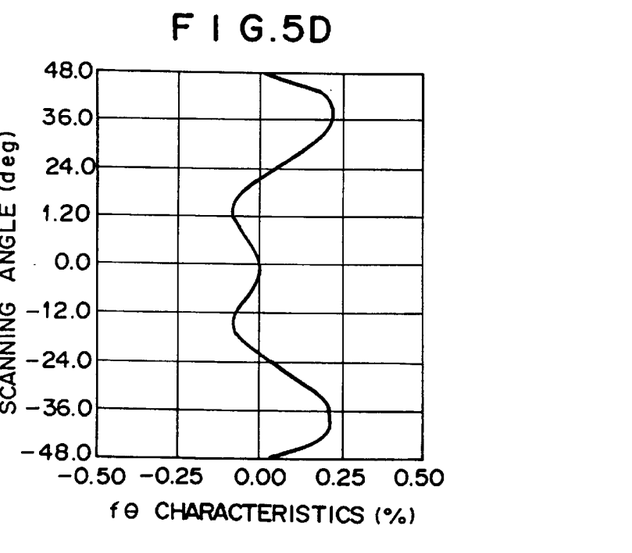

The imaging optical system shown in table 4 and FIGS. 5A and 5B is designed so that the axial lateral magnification M becomes −0.5 and the power of the anamorphic lens in the main scanning direction becomes weaker. The power ratio $\phi1/\phi$ is 0.54. Accordingly the imaging optical system of this example cannot satisfy formula (2) and accordingly is larger than 23% in fluctuation in lateral magnification (diamond mark d in FIG. 12).

TABLE 4

| | M = −0.5 | φ1/φ = 0.54 | |
|---|---|---|---|
| R | d | n | note |
| R1 = −148.564 * | $d_0$ = 34.18 | | |
| K = −14.644 | | | |
| $a_1$ = −0.10281 E-05 | | | |
| $a_2$ = 0.63246 E-09 | | | |
| $a_3$ = −0.31298 E-12 | | | |
| $a_4$ = 0.39528 E-16 | $d_1$ = 20.94 | $n_1$ = 1.526750 | |
| R2 = −93.193 * | | | |
| K = 1.3152 | | | |
| $a_1$ = −0.37030 E-07 | | | |
| $a_2$ = 0.816683 E-10 | | | |
| $a_3$ = 0.134247 E-13 | | | |
| | $d_2$ = 32.00 | | |
| $a_4$ = −0.836380 E-17 | | | |
| R3 = −44.002 : sub | | | |
| = ∞ : main | $d_3$ = 32.00 | $n_3$ = 1.614977 | |
| R4 = −238.697 | | | |
| | $d_4$ = 77.22 | | |
| R5 = −178.662 | | | CYM plane |
| | d5 = 117.05 | | |
| | | | image plane |

Figure 6A:
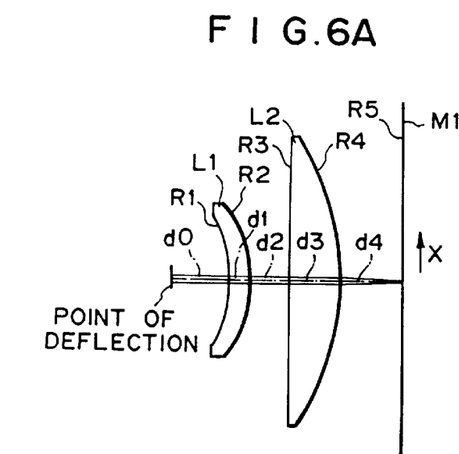
FIGS. 6A to 6D are a cross-sectional view taken in the main scanning direction of another example of an imaging optical system in which fluctuation in lateral magnification is not smaller than 23%, a cross-sectional view taken in the sub-scanning direction of the imaging optical system, a view showing the characteristics of curvature of field of the imaging optical system, and a view showing the fθ characteristics of the imaging optical system, respectively.
Figure 6B:
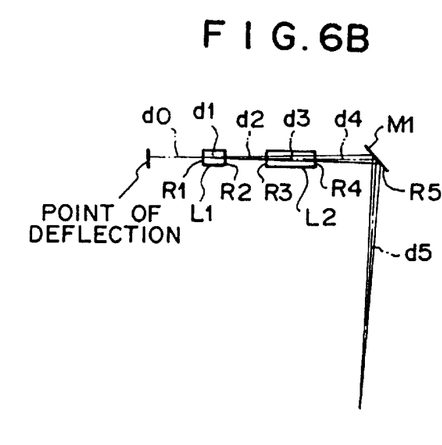
Figure 6C:
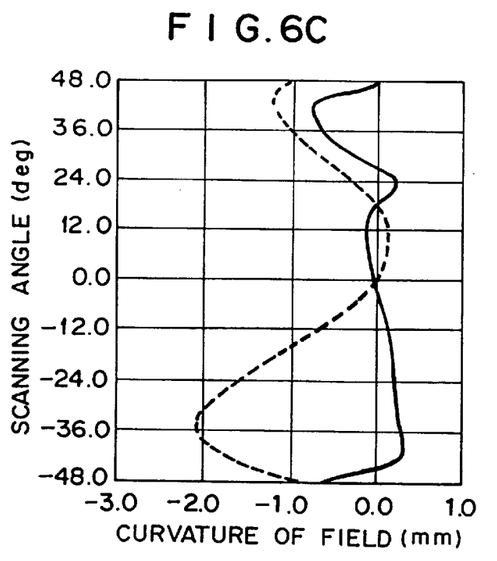
Figure 6D:
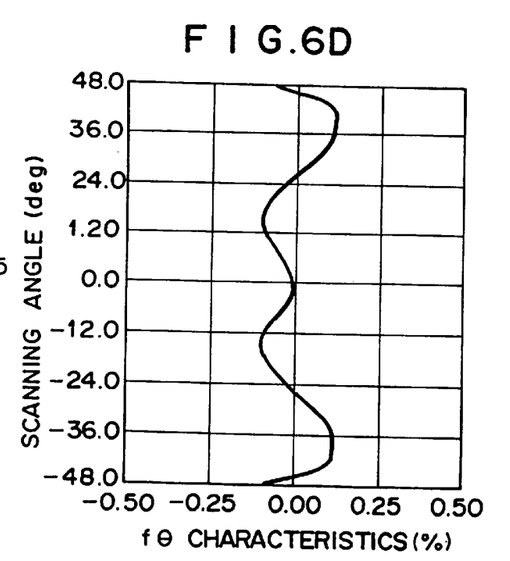

In the imaging optical system shown in table 5 and FIGS. 6A and 6B, the radius of curvature in the sub-scanning direction of the anamorphic lens L2 and the radius of curvature of the cylindrical lens M1 are changed so that the axial lateral magnification M becomes −1.0 and the power ratio φ1/φ is 0.71. Accordingly the imaging optical system of this example cannot satisfy formula (2) and accordingly is larger than 23% in fluctuation in lateral magnification (square mark e in FIG. 12).

TABLE 5

| | M = −1.0 | φ1/φ = 0.71 | |
|---|---|---|---|
| R | d | n | note |
| R1 = −109.024 * | $d_0$ = 36.50 | | |
| K = −1.4243 | | | |
| $a_1$ = −0.10257 E-05 | | | |
| $a_2$ = 0.78737 E-09 | | | |
| $a_3$ = −0.28244 E-12 | | | |
| $a_4$ = 0.68860 E-17 | $d_1$ = 14.40 | $n_1$ = 1.526750 | |
| R2 = −87.901 * | | | |
| K = 1.3381 | | | |
| $a_1$ = −0.25258 E-06 | | | |
| $a_2$ = 0.21942 E-09 | | | |
| $a_3$ = 0.17566 E-13 | | | |
| | $d_2$ = 26.60 | | |
| $a_4$ = −0.118285 E-16 | | | |
| R3 = −43.376 : sub | | | |
| = ∞ : main | $d_3$ = 32.00 | $n_3$ = 1.614977 | |
| R4 = −180.668 | | | |
| | $d_4$ = 40.15 | | |
| R5 = −181.903 | | | CYM plane |
| | d5 = 165.25 | | |
| | | | image plane |

In the imaging optical systems shown in tables 6 to 8 and FIGS. 7 (7A and 7B) to 9 (9A and 9B), the radius of curvature of the positive meniscus lens L1, the radius of curvature in the sub-scanning direction of the anamorphic lens L2 and the radius of curvature of the cylindrical lens M1 are changed.

Figure 7A:
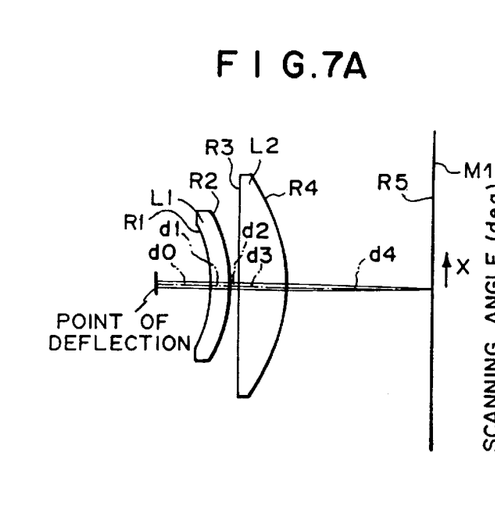
FIGS. 7A to 7D are a cross-sectional view taken in the main scanning direction of still another example of an imaging optical system in which fluctuation in lateral magnification is not smaller than 23%, a cross-sectional view taken in the sub-scanning direction of the imaging optical system, a view showing the characteristics of curvature of field of the imaging optical system, and a view showing the fθ characteristics of the imaging optical system, respectively.
Figure 7B:
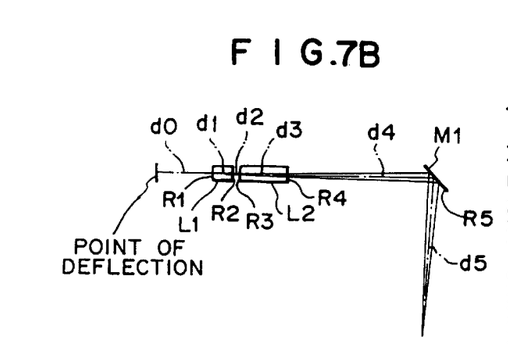
Figure 7C:
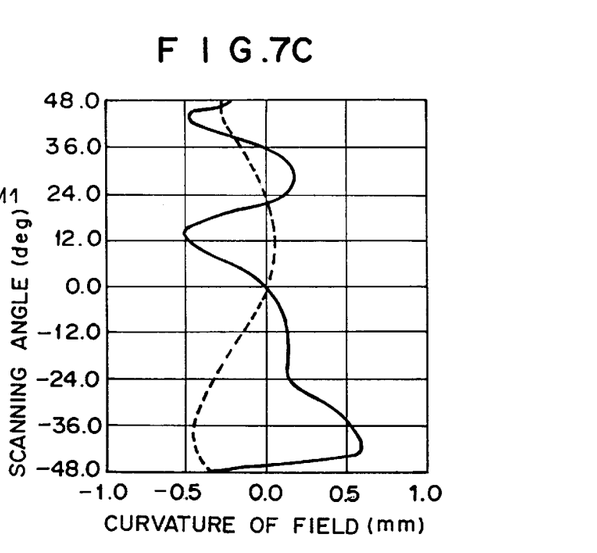
Figure 7D:
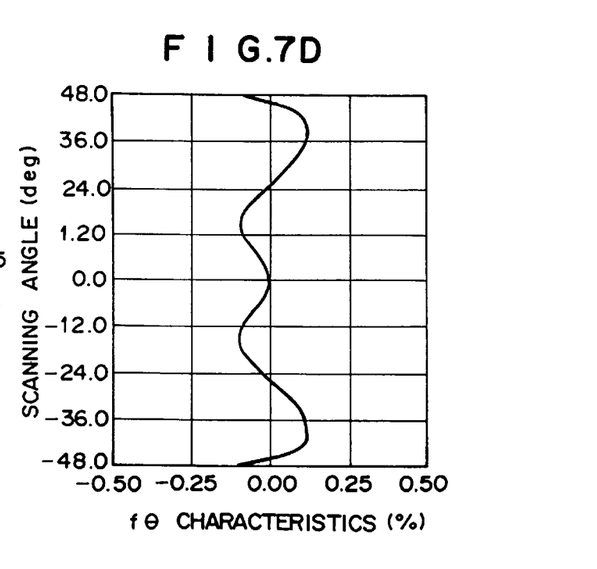
Figure 8A:
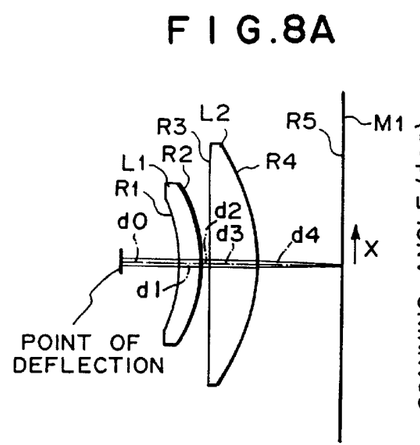
FIGS. 8A to 8D are a cross-sectional view taken in the main scanning direction of still another example of an imaging optical system in which fluctuation in lateral magnification is not smaller than 23%, a cross-sectional view taken in the sub-scanning direction of the imaging optical system, a view showing the characteristics of curvature of field of the imaging optical system, and a view showing the fθ characteristics of the imaging optical system, respectively.
Figure 8B:
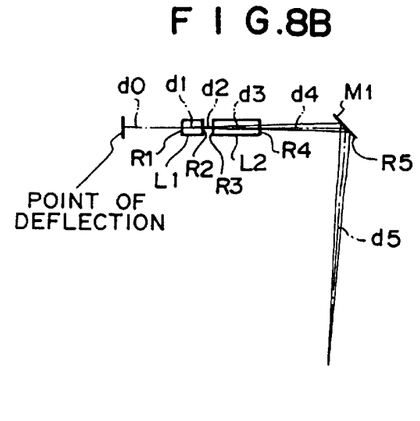
Figure 8C:
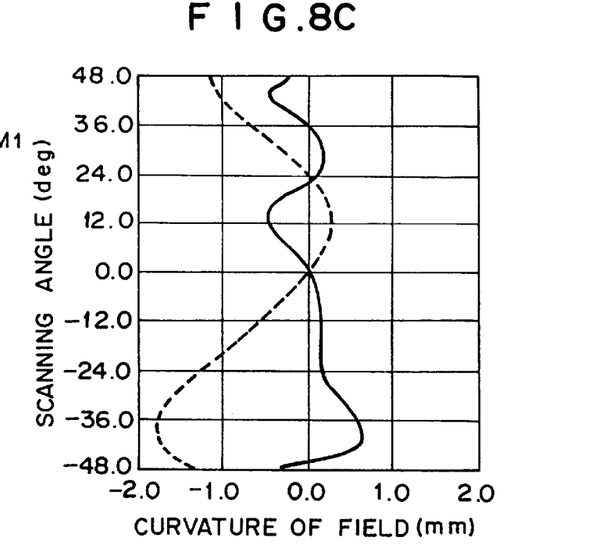
Figure 8D:
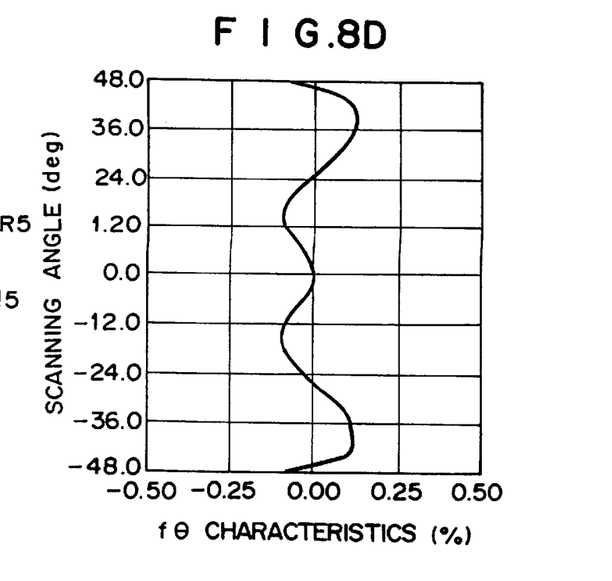
Figure 9A:
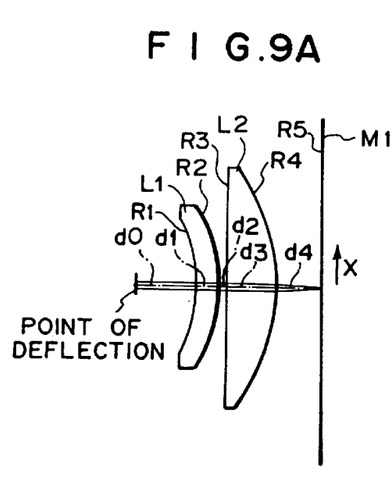
FIGS. 9A to 9D are a cross-sectional view taken in the main scanning direction of still another example of an imaging optical system in which fluctuation in lateral magnification is not smaller than 23%, a cross-sectional view taken in the sub-scanning direction of the imaging optical system, a view showing the characteristics of curvature of field of the imaging optical system, and a view showing the fθ characteristics of the imaging optical system, respectively.
Figure 9B:
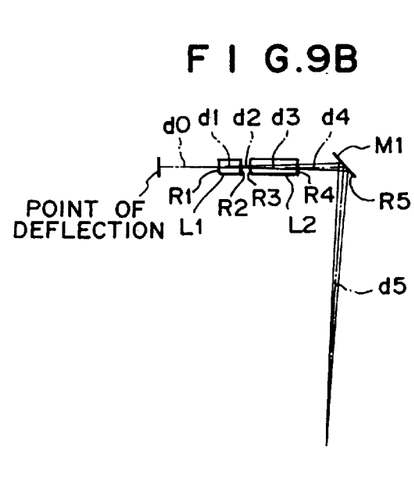
Figure 9C:
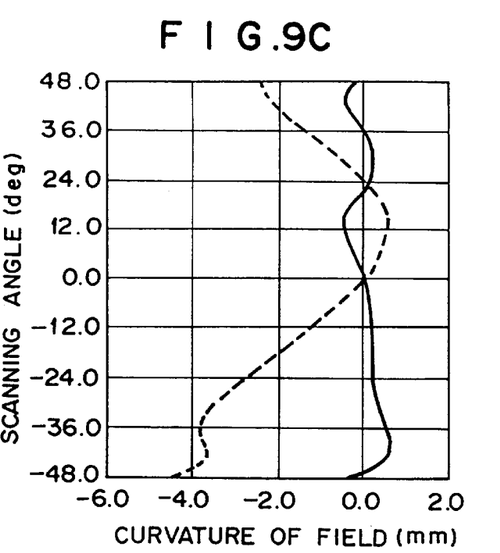
Figure 9D:
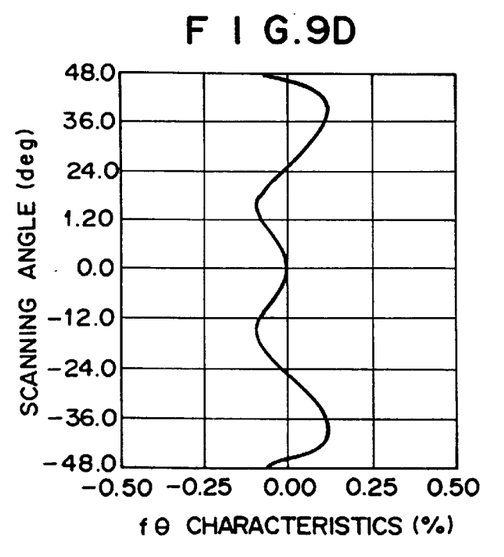

The imaging optical system shown in table 6 and FIGS. 7A and 7B is −0.5 in the axial lateral magnification M and 0.92 in the power ratio φ1/φ (diamond mark f in FIG. 12). Accordingly it cannot satisfy formula (2) and is larger than 23% in fluctuation in lateral magnification. The imaging optical system shown in table 7 and FIGS. 8A and 8B is −1.0 in the axial lateral magnification M and 0.92 in the power ratio φ1/φ (square mark g in FIG. 12). Accordingly it cannot satisfy formula (2) and is larger than 23% in fluctuation in lateral magnification. The imaging optical system shown in table 8 and FIGS. 9A and 9B is −1.5 in the axial lateral magnification M and 0.92 in the power ratio φ1/φ (triangular mark h in FIG. 12). Accordingly it cannot satisfy formula (2) and is larger than 23% in fluctuation in lateral magnification.

TABLE 6

| | M = −0.5 | φ1/φ = 0.92 | |
|---|---|---|---|
| R | d | n | note |
| R1 = −105.513 * | $d_0$ = 38.00 | | |
| K = −1.0715 | | | |
| $a_1$ = −0.11059 E-05 | | | |
| $a_2$ = 0.80000 E-09 | | | |
| $a_3$ = −0.19827 E-12 | | | |
| $a_4$ = 0.10760 E-16 | $d_1$ = 15.00 | $n_1$ = 1.526750 | |
| R2 = −106.424 * | | | |
| K = 1.2965 | | | |
| $a_1$ = −0.34827 E-06 | | | |
| $a_2$ = 0.23039 E-09 | | | |
| $a_3$ = −0.45024 E-14 | | | |
| | $d_2$ = 5.00 | | |
| $a_4$ = −0.24601 E-17 | | | |
| R3 = −40.946 : sub | | | |
| = ∞ : main | $d_3$ = 32.00 | $n_3$ = 1.614977 | |
| R4 = −140.591 | | | |
| | $d_4$ = 104.32 | | |
| R5 = −187.083 | | | CYM plane |
| | d5 = 114.72 | | |
| | | | image plane |

TABLE 7

| | M = −1.0 | φ1/φ = 0.92 | |
|---|---|---|---|
| R | d | n | note |
| R1 = −105.513 * | $d_0$ = 38.00 | | |
| K = −1.0715 | | | |
| $a_1$ = −0.11059 E-05 | | | |
| $a_2$ = 0.80000 E-09 | | | |
| $a_3$ = −0.19827 E-12 | | | |
| $a_4$ = 0.10760 E-16 | $d_1$ = 15.00 | $n_1$ = 1.526750 | |
| R2 = −106.424 * | | | |
| K = 1.2965 | | | |
| $a_1$ = −0.34827 E-06 | | | |
| $a_2$ = 0.23039 E-09 | | | |
| $a_3$ = −0.45024 E-14 | | | |
| | $d_2$ = 5.00 | | |
| $a_4$ = −0.24601 E-17 | | | |
| R3 = −40.532 : sub | | | |
| = ∞ : main | $d_3$ = 32.00 | $n_3$ = 1.614977 | |
| R4 = −140.591 | | | |
| | $d_4$ = 56.24 | | |
| R5 = −189.965 | | | CYM plane |
| | d5 = 162.79 | | |
| | | | image plane |

TABLE 8

| | M = −1.5 | φ1/φ = 0.92 | |
|---|---|---|---|
| R | d | n | note |
| R1 = −105.513 * | $d_0$ = 38.00 | | |
| K = −1.0715 | | | |
| $a_1$ = −0.11059 E-05 | | | |
| $a_2$ = 0.80000 E-09 | | | |
| $a_3$ = −0.19827 E-12 | | | |
| $a_4$ = 0.10760 E-16 | $d_1$ = 15.00 | $n_1$ = 1.526750 | |

TABLE 8-continued

| | M = −1.5 | φ1/φ = 0.92 | |
|---|---|---|---|
| R | d | n | note |
| R2 = −106.424 * | | | |
| K = 1.2965 | | | |
| $a_1$ = −0.34827 E-06 | | | |
| $a_2$ = 0.23039 E-09 | | | |
| $a_3$ = −0.45024 E-14 | | | |
| | $d_2$ = 5.00 | | |
| $a_4$ = −0.24601 E-17 | | | |
| R3 = −41.036 : sub | | | |
| = ∞ : main | $d_3$ = 32.00 | $n_3$ = 1.614977 | |
| R4 = −140.591 | | | |
| | $d_4$ = 30.12 | | CYM plane |
| R5 = −173.276 | | | |
| | $d_5$ = 188.91 | | image plane |

As can be understood from the description above, in the imaging optical system in accordance with the present invention, when the ratio φ1/φ of the power of the anamorphic lens in the main scanning direction to the power of the entire imaging optical system in the main scanning direction satisfies formula "$0 \leq \phi1/\phi \leq 0.1|M|+0.45$", fluctuation in lateral magnification by the scanning angle can be suppressed to not larger than 23%, and when the ratio φ1/φ satisfies formula "$0 \leq \phi1/\phi \leq 0.1|M|+0.35$", fluctuation in lateral magnification by the scanning angle can be suppressed to not larger than 20%.

Further in such an imaging optical system, aberrations are well corrected and also the fθ characteristics are excellent.

What is claimed is:

1. An imaging optical system for a light beam scanning system for causing a light bundle deflected by a deflector to form an image on a surface to be scanned and causing the image of the light bundle to scan the surface at a constant speed, comprising:

a positive meniscus lens; and an anamorphic lens for compensating for tilt of a deflecting surface of the deflector;

wherein the imaging optical system satisfies formula $$0 \leq \phi1/\phi \leq 0.1|M|+0.45$$

wherein φ1 represents the power of the anamorphic lens in a main scanning direction, φ represents the power of the entire imaging optical system in the main scanning direction and M represents a lateral magnification when a deflecting angle by the deflector is 0.

2. An imaging optical system as defined in claim 1 in which the imaging optical system satisfies formula $0 \leq \phi1/\phi \leq 0.1|M|+0.35$.

3. An imaging optical system as claimed in claim 1 further comprising:

a cylindrical mirror having power only in a sub-scanning direction;

wherein said anamorphic lens has positive power in the main scanning direction, and wherein said positive meniscus lens, said anamorphic lens and said cylindrical mirror are arranged in this order from the deflector.

4. An imaging optical system as defined in claim 1 in which said positive meniscus lens is made of plastic.

5. An imaging optical system as defined in claim 1 in which said positive meniscus lens is aspheric in at least one side.

6. An imaging optical system as defined in claim 1 in which a first surface of the anamorphic lens facing the deflector is a concave cylindrical surface having power only in a sub-scanning direction and a second surface of the anamorphic lens facing the surface to be scanned is a convex spherical surface.

7. An imaging optical system for a light beam scanning system for causing a light bundle deflected by a deflector to form an image on a scannable surface and causing the image of the light bundle to scan the scannable surface at a constant speed, comprising:

a positive meniscus lens formed substantially from plastic;

an anamorphic lens formed substantially from glass, for compensating for tilt of a deflecting surface of said deflector, wherein said anamorphic lens has positive power in a main scanning direction; and a cylindrical mirror having power only in a sub-scanning direction;

wherein said positive meniscus lens, said anamorphic lens, and said cylindrical mirror are arranged in this order from said deflector, and wherein the imaging optical system satisfies formula $$0 \leq \phi1/\phi \leq 0.1|M|+0.45$$

wherein φ1 represents the power of the anamorphic lens in a main scanning direction, φ represents the power of the entire imaging optical system in the main scanning direction and M represents a lateral magnification when a deflecting angle by the deflector is 0.

8. An imaging optical system as claimed in claim 7, wherein said positive meniscus lens is aspheric in at least one face.

9. An imaging optical system as claimed in claim 7, wherein said anamorphic lens further comprises:

a first face, facing towards said deflector, formed substantially as a concave cylindrical face having power only in said sub-scanning direction; and a second face, facing towards said cylindrical mirror, formed substantially as a convex spherical face.

10. An imaging optical system for a light beam scanning system for causing a light bundle deflected by a deflector to form an image on a surface to be scanned and causing the image of the light bundle to scan the surface at a constant speed, comprising:

an anamorphic lens for compensating for tilt of a deflecting surface of the deflector; and a cylindrical mirro having power only in a sub-scanning direction;

wherein the imaging optical system satisfies formula $$0 \leq \phi1/\phi \leq 0.1|M|+0.45$$

wherein φ1 represents the power of the anamorphic lens in a main scanning direction, φ represents the power of the entire imaging optical system in the main scanning direction and M represents a lateral magnification when a deflecting angle by the deflector is 0.

11. An imaging optical system as defined in claim 10 in which the imaging optical system satisfies formula $0 \leq \phi1/\phi \leq 0.1|M|+0.35$.

12. An imaging optical system as claimed in claim 10 further comprising:

a positive meniscus lens;

wherein said anamorphic lens has positive power in the main scanning direction, and wherein said positive meniscus lens, said anamorphic lens and said cylindrical mirror are arranged in this order from the deflector.

13. An imaging optical system as defined in claim 12 in which said positive meniscus lens is made of plastic.

14. An imaging optical system as defined in claim 12 in which said positive meniscus lens is aspheric in at least one side.

15. An imaging optical system as defined in claim 10 in which a first surface of the anamorphic lens facing the deflector is a concave cylindrical surface having power only in a sub-scanning direction and a second surface of the anamorphic lens facing the surface to be scanned is a convex spherical surface.

* * * * *